United States Patent [19]
Plummer

[11] Patent Number: 6,073,916
[45] Date of Patent: Jun. 13, 2000

[54] POWERED CABLE FEEDING SYSTEM

[75] Inventor: Jeffrey J. Plummer, Rockford, Ill.

[73] Assignee: Greenlee Textron Inc., Rockford, Ill.

[21] Appl. No.: 09/168,665

[22] Filed: Oct. 8, 1998

[51] Int. Cl.[7] ............................................ B63B 35/03
[52] U.S. Cl. .................................. 254/134.3 R; 226/182
[58] Field of Search ................... 254/134.3 R, 134.3 FT; 226/109, 181, 182

[56] References Cited

U.S. PATENT DOCUMENTS

| | | | |
|---|---|---|---|
| 2,655,653 | 10/1953 | Chauvin | 254/134.3 FT |
| 3,788,575 | 1/1974 | Boettcher et al. | |
| 4,043,494 | 8/1977 | Bickford et al. | 226/109 |
| 4,066,093 | 1/1978 | Egerstrom | |
| 4,445,668 | 5/1984 | Sauber | |
| 4,779,784 | 10/1988 | Giroux | 226/182 |
| 5,039,252 | 8/1991 | Schuermann | |
| 5,109,598 | 5/1992 | Koch | |
| 5,139,751 | 8/1992 | Mansfield et al. | |
| 5,553,763 | 9/1996 | Ring | 226/182 |
| 5,601,223 | 2/1997 | Koch et al. | |
| 5,624,207 | 4/1997 | Berges | 226/181 |
| 5,632,356 | 5/1997 | Sells | |
| 5,681,131 | 10/1997 | Goldenberg et al. | |

OTHER PUBLICATIONS

A sheet containing three color photographs of a device called "HIS cable feeder" believed to be prior art.
A copy of a sales brochure relating to a device called "HIS Cable Feeder," HIS Business Manufacturing Co., unknown date.
A copy of a six (6) page brochure describing a device called "Gentle Giant," Modular Systems, unknown date.

Primary Examiner—David A. Scherbel
Assistant Examiner—Daniel G. Shanley
Attorney, Agent, or Firm—Trexler, Bushnell, Giangiorgi & Blackstone, Ltd.

[57] ABSTRACT

A device for removing a plurality of cables from a plurality of reels and thereafter feeding or advancing the cables to, for example, a conduit. The device includes a pair of rotary members positionable relative to each other such that the cables are frictionally retained therebetween. Each of the rotary members has a generally flexible peripheral surface which frictionally contacts the plurality of cables and generally at least partially conforms thereto. A motor is connected to at least one of the rotary members, and the motor rotates the rotary member thereby causing the rotary members to pull the cables from the reels and thereafter advance or feed the cables to, for example, a conduit.

28 Claims, 13 Drawing Sheets

POWERED CABLE FEEDING SYSTEM

BACKGROUND

The present invention generally relates to devices for feeding cables from reels to, for example, a conduit, and more specifically relates to a powered device having rotating members for feeding cables.

When cables, such as electrical, coaxial, telephone cables, etc. are first installed in a building, the cables are typically run through a conduit which has been previously installed in the walls of the building after the building has been framed, but before the wall surfaces have been erected. The process for running the cables through the conduit typically starts with a worker shooting or blowing a "mouse" (a form of a plug) through the conduit where the mouse is connected to the end of a strong, lightweight nylon cord. Blowing of the mouse is achieved by placing the mouse in the conduit and applying air pressure behind the mouse to force it through the conduit. The mouse has a diameter which is slightly less than the diameter of the conduit. Therefore, the air pressure which is applied behind the mouse causes the mouse to move through the conduit.

After the mouse has been blown through the conduit such that the mouse appears at the other end of the conduit, a heavier synthetic rope or steel cable is connected to the end of the nylon cord, and the nylon cord is pulled back through the conduit so that the steel cable is pulled through the conduit. Once the nylon cord has been pulled completely back through the conduit to provide that the end of the steel cable appears at the end of the conduit, a grouping of cables, where each cable is carried on an individual reel, is connected to the end of the steel cable which has not yet entered the conduit. Then, the steel cable is pulled completely through the conduit as the cables unwind from their respective reels, and the cables advance in the conduit. Typically, a lubricant must be applied to the cables being pulled through the conduit to reduce friction, thereby facilitating movement of the cables through the conduit and avoiding undue damage to the cables. Once the cables appear at the end of the conduit, the cables are disconnected from the steel cable, and the installation of the cables in the conduit is complete.

Manual installation of the cables into the conduit typically requires several workers. A separate worker is often needed to unwind each cable from its respective reel. Also, a worker is needed to lubricate the grouping of cables as the grouping enters the conduit.

There are some commercially-available devices which are designed for use in pulling cables off reels and feeding the cables to a conduit. However, some of these devices do not readily conform to cables having different diameters. Additionally, many of these devices may not prevent the cables from overlapping and becoming tangled during the feeding operation. Also, none of these devices provide that a smaller cable, such as a ground cable, is kept separate from the remaining cables during the feeding operation. Hence, in pulling the larger cables in the grouping, the device may not pull the smaller cables in the grouping as efficiently as the larger cables. This may be due to, for example, inadequate traction with the smaller cables as a result of engagement with the larger cables. Still yet further, while some of the devices provide rotating members for pulling the cables off the reels, the devices provide that the cables must be fed to and removed from the rotating members while the rotating members are generally in contact with each other and rotating. This can prove relatively difficult to do. Finally, many of the cable feeding devices which are commercially available are relatively difficult to transport, and many of these device must be anchored to the ground during the pulling operation to prevent the device from moving substantially toward the reels.

SUMMARY

An object of the present invention is to provide a cable feeding device which readily conforms to cables having different diameters.

Another object of the present invention is to provide a cable feeding device which prevents the cables from overlapping and becoming tangled during the feeding operation.

Still another object of the present invention is to provide a cable feeding device which provides that a smaller cable, such as a ground cable, is kept separate from the remaining cables during the feeding operation, thereby ensuring adequate traction with the smaller cable.

Still yet another object of the present invention is to provide a cable feeding device which does not necessarily have to be anchored to the ground during the feeding operation to prevent the device from moving substantially toward the reels carrying the cables.

Still yet a further object of the present invention is to provide a cable feeding device which is relatively easy to transport.

Briefly, and in accordance with at least one of the foregoing objects, the present invention envisions a device for removing a plurality of cables from a plurality of reels and thereafter feeding or advancing the cables to, for example, a conduit. The device includes a pair of rotary members positionable relative to each other such that the cables are frictionally retained therebetween. Each of the rotary members has a generally flexible peripheral surface which frictionally contacts the plurality of cables and generally at least partially conforms thereto. A motor is connected to at least one of the rotary members, and the motor rotates the rotary member thereby causing the rotary members to pull the cables from the reels and thereafter advance or feed the cables to, for example, a conduit.

Preferably, at least one of the rotary members is pivotable with respect to the other thereby providing that at least one cable can be inserted between the rotary members without having to feed the cable between the rotary members while they are in contact with each other and rotating. Also, preferably the device includes a divider for receiving the cables from the reels before the cables travel to the rotary members, where the divider is configured for keeping the cables spaced away from each other as the cables are fed to the rotary members. Still further, preferably the device includes a sub-divider which is located between the divider and the rotary members, and the sub-divider keeps one or more cables, such as the relatively smaller cables, spaced away from the other cables during the feeding operation. Still yet further, preferably the device includes mounting structure which extends from the device and contacts structure which carries at least one of the reels of cable, and the mounting structure prevents the device from moving substantially toward the structure carrying the cable during the feeding operation. To provide that the device can be relatively easily transported, preferably the device includes handles for moving the device, and the handles are preferably at least partially extendable from and retractable into a portion of the device.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

Figure 5:
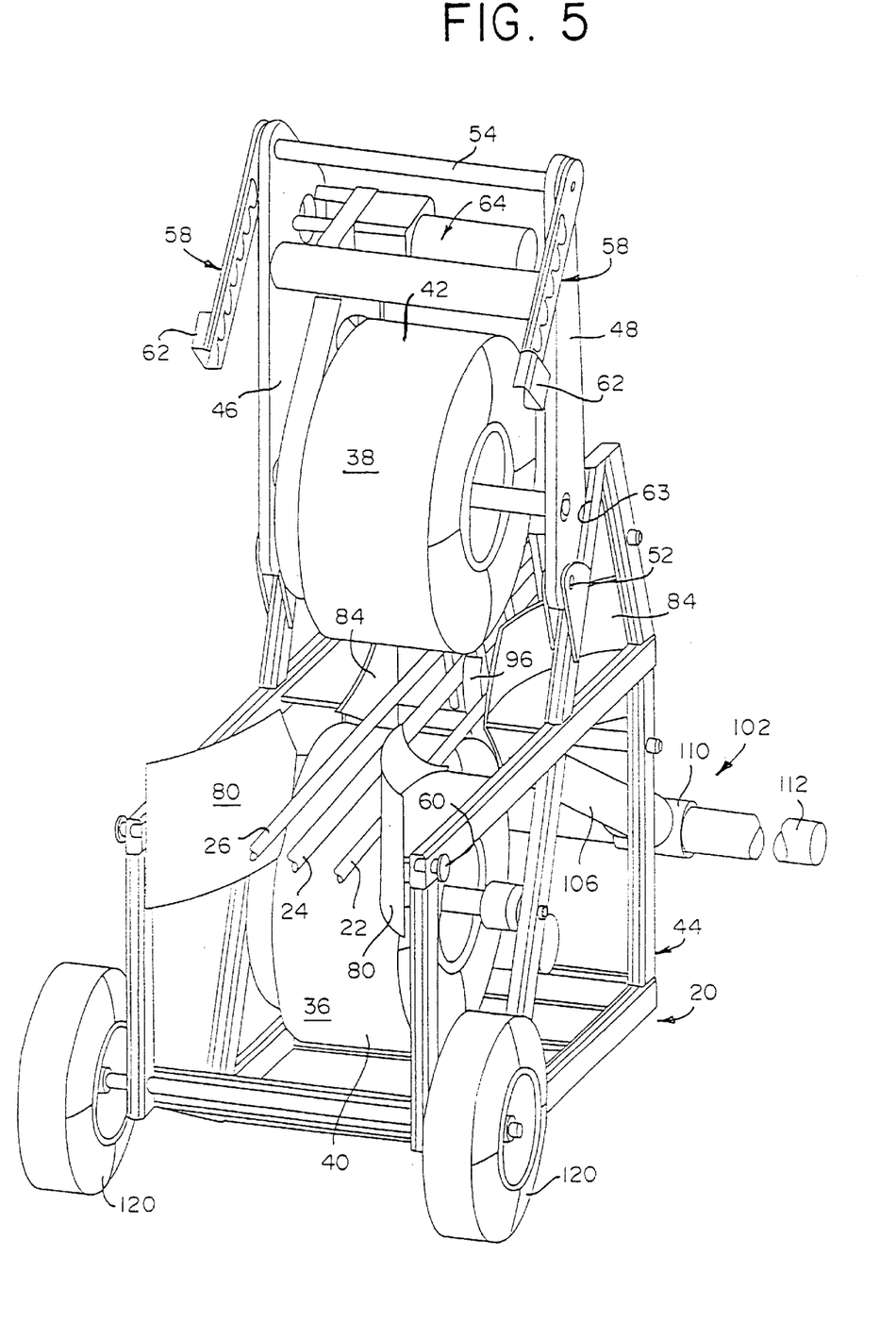
FIG. 5 is a front, left perspective view of the cable feeding device illustrated in FIG. 1, showing the device in a fully open position.
Figure 6:
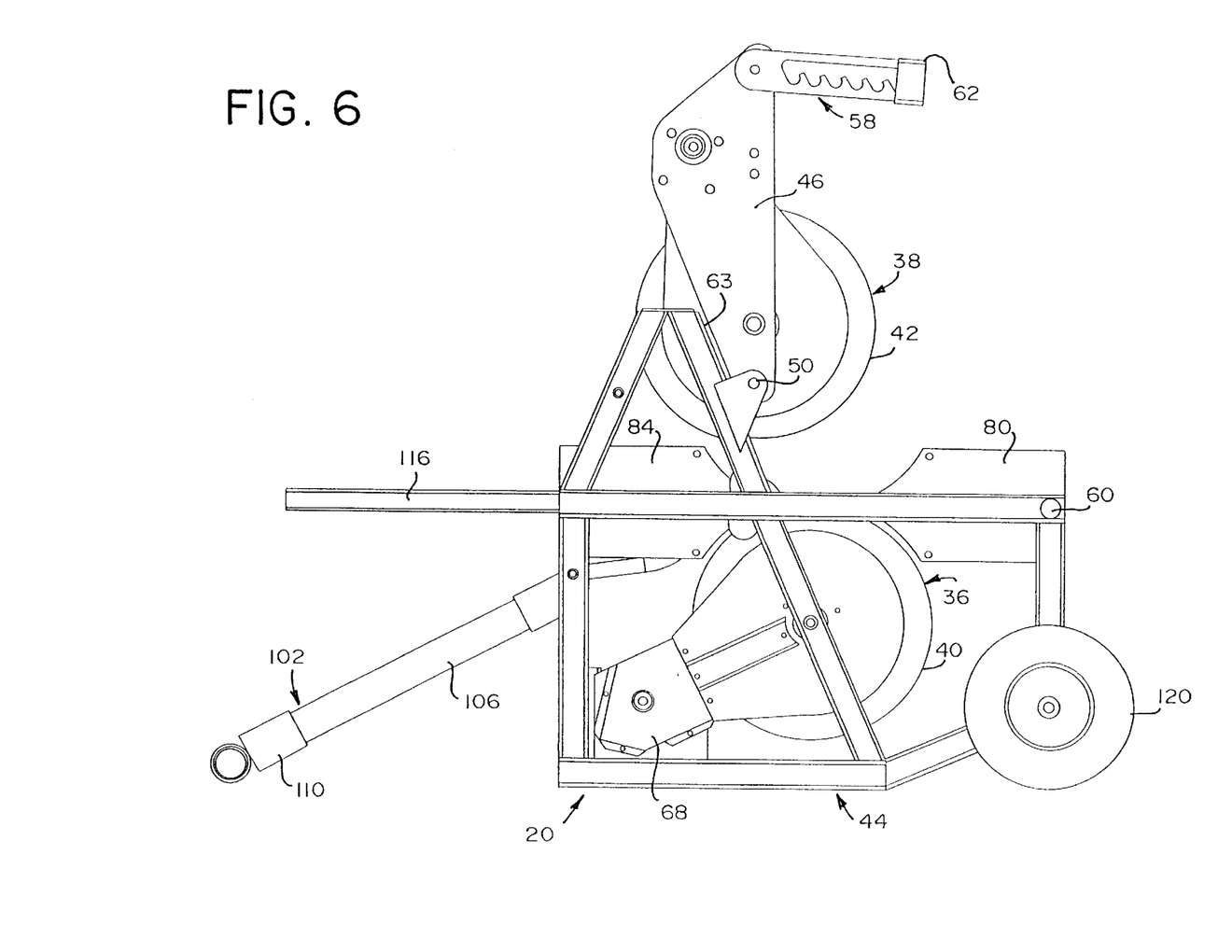
FIG. 6 is a side view of the cable feeding device illustrated in FIG. 1, showing the device in an open position.
Figure 7:
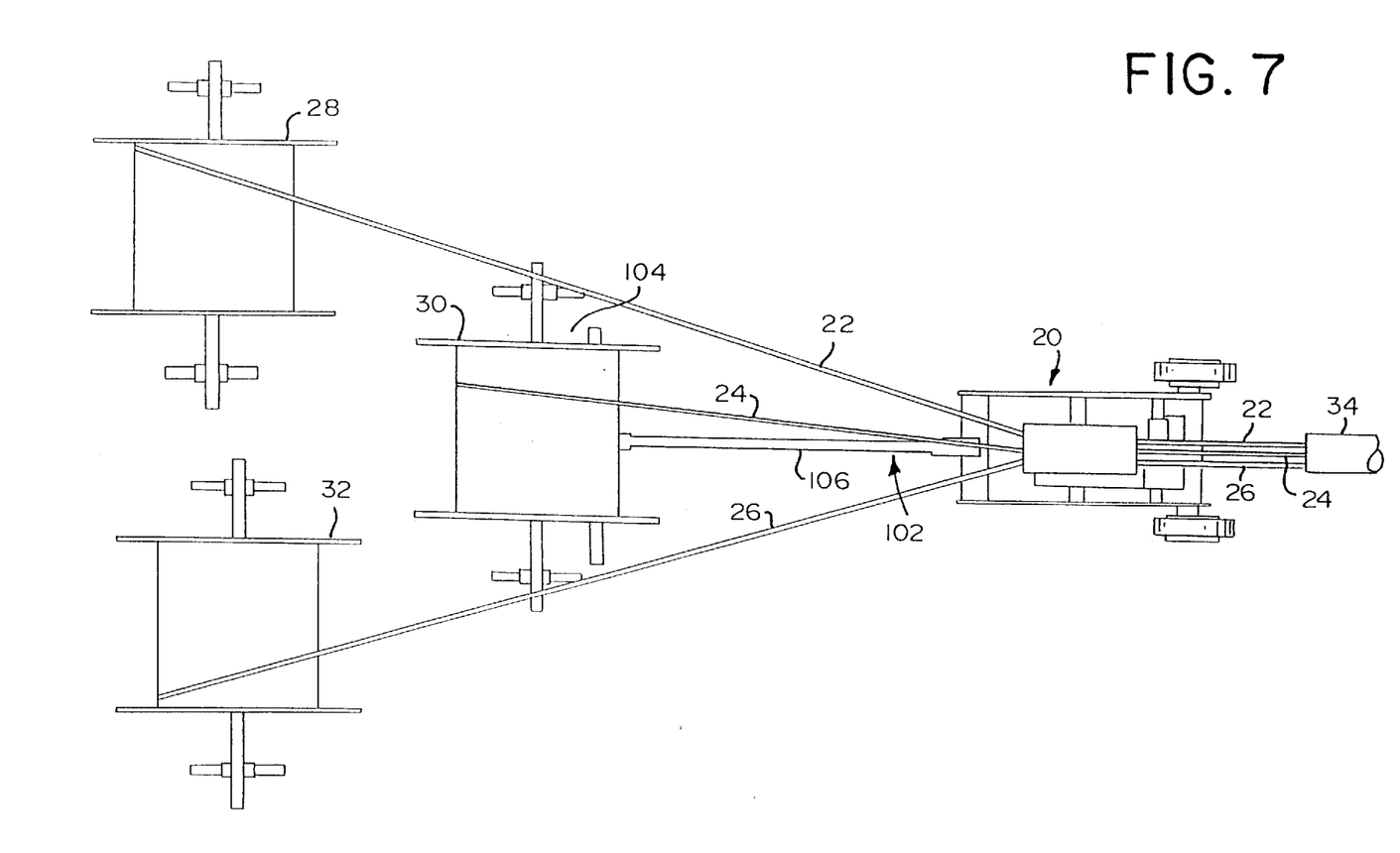
FIG. 7 is a schematic view showing the cable feeding device of the previous Figures being used to feed cables from three reels to a conduit.

Shown in FIGS. 1–10 and 13 is a cable feeding device 20 for feeding cables 22, 24, 26 from reels 28, 30, 32 to, for example, a conduit 34 (see FIG. 7). The device 20 includes two rotating members 36 and 38, and preferably each rotating member 36, 38 is a pneumatic tire whose internal air pressure can be selectively varied. The rotating members 36, 38 can pull several cables 22, 24, 26 from individual reels 28, 30, 32, and can forward the cables 22, 24, 26 to the conduit 34. As will be described more fully herein, the rotating members 36, 38 pull and forward the cables 22, 24, 26 as a result of frictional engagement between outer peripheral surfaces 40, 42 of the rotating members 36, 38 and the cables 22, 24, 26.

Figure 1:
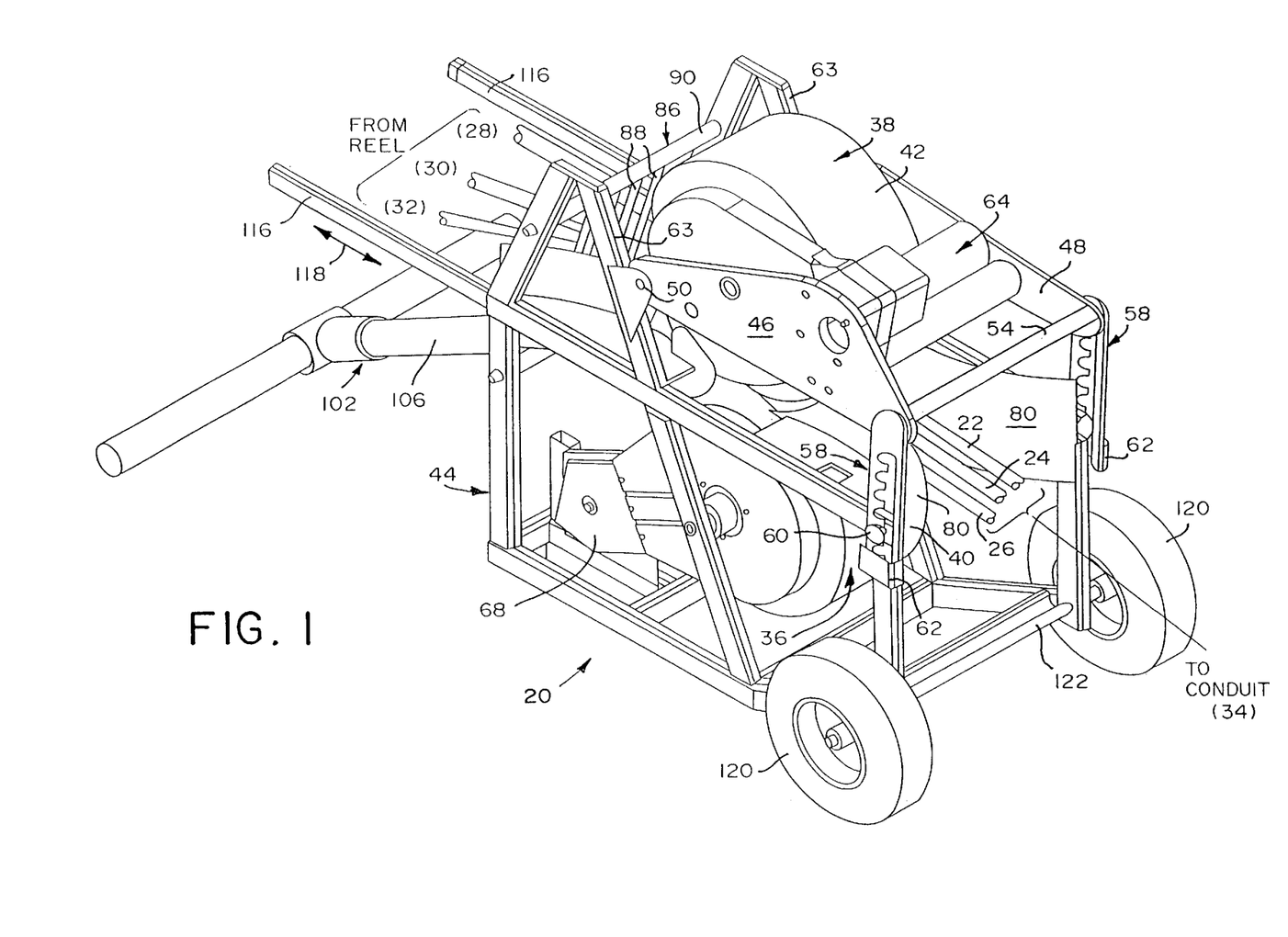
FIG. 1 is a front, perspective view of a cable feeding device which is in accordance with an embodiment of the present invention.
Figure 2:
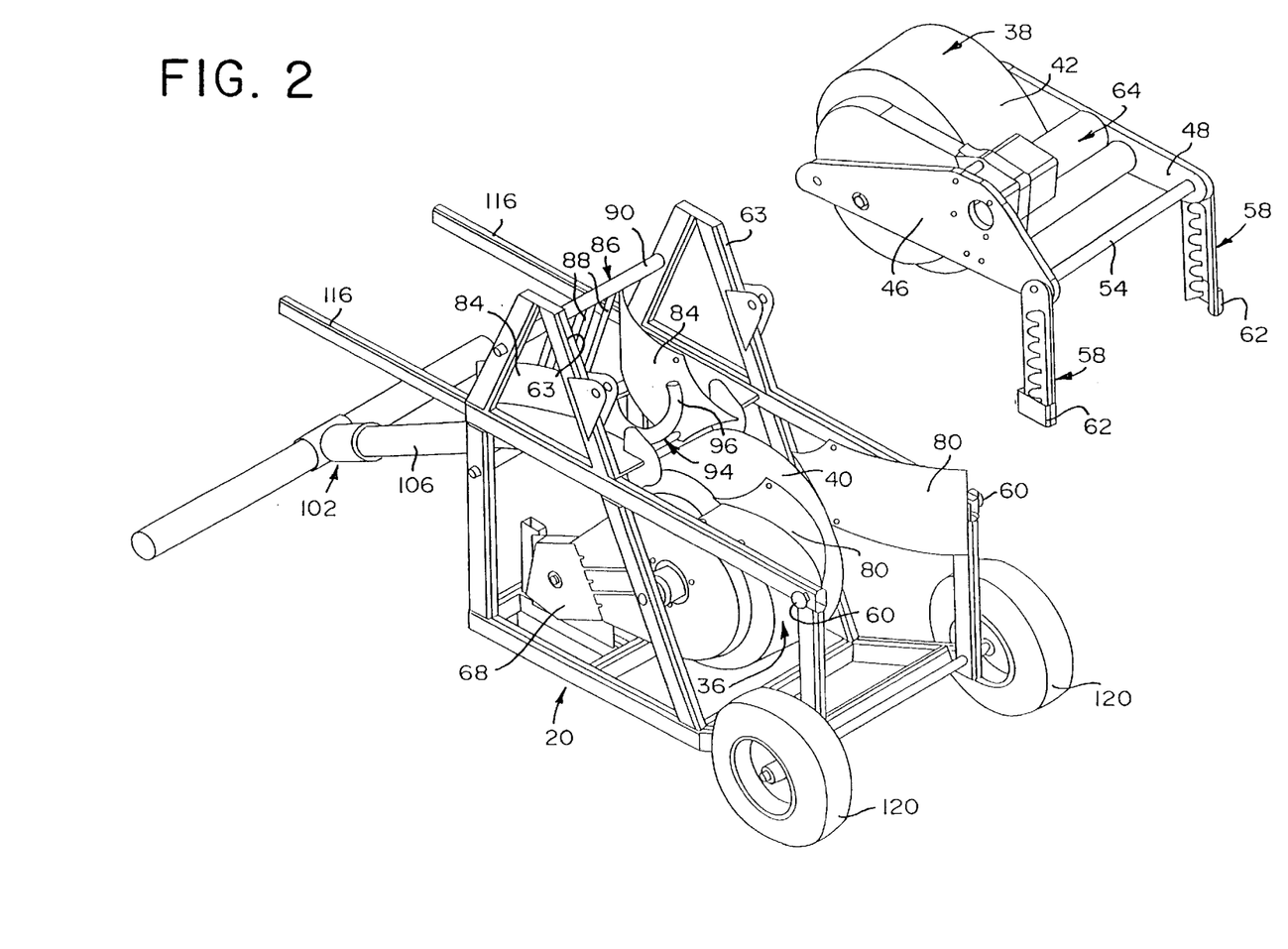
FIG. 2 is a front, perspective view of the cable feeding device illustrated in FIG. 1, showing a top portion thereof exploded away from the remainder of the device.
Figure 3:
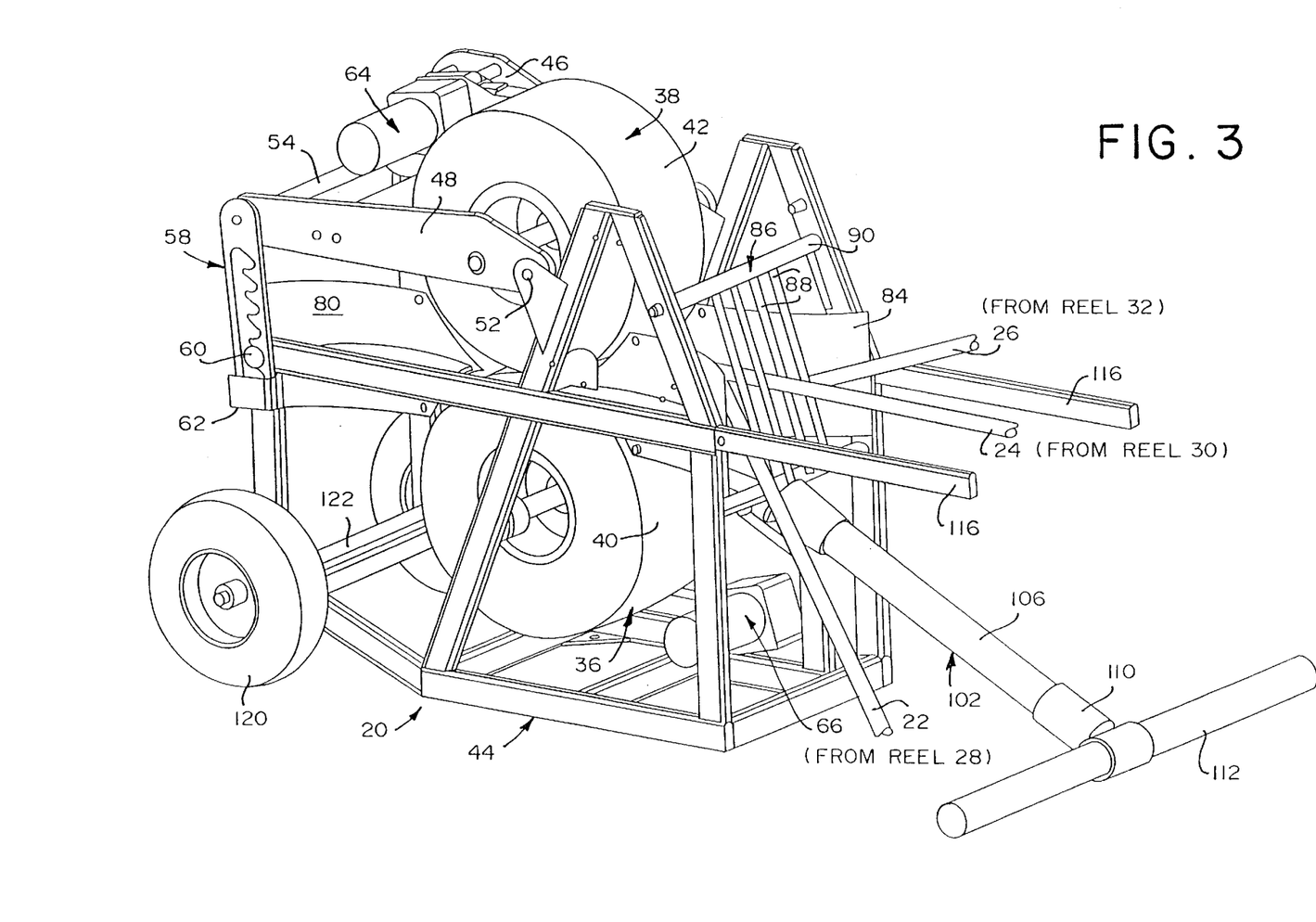
FIG. 3 is a rear, perspective view of the cable feeding device illustrated in FIG. 1.
Figure 4:
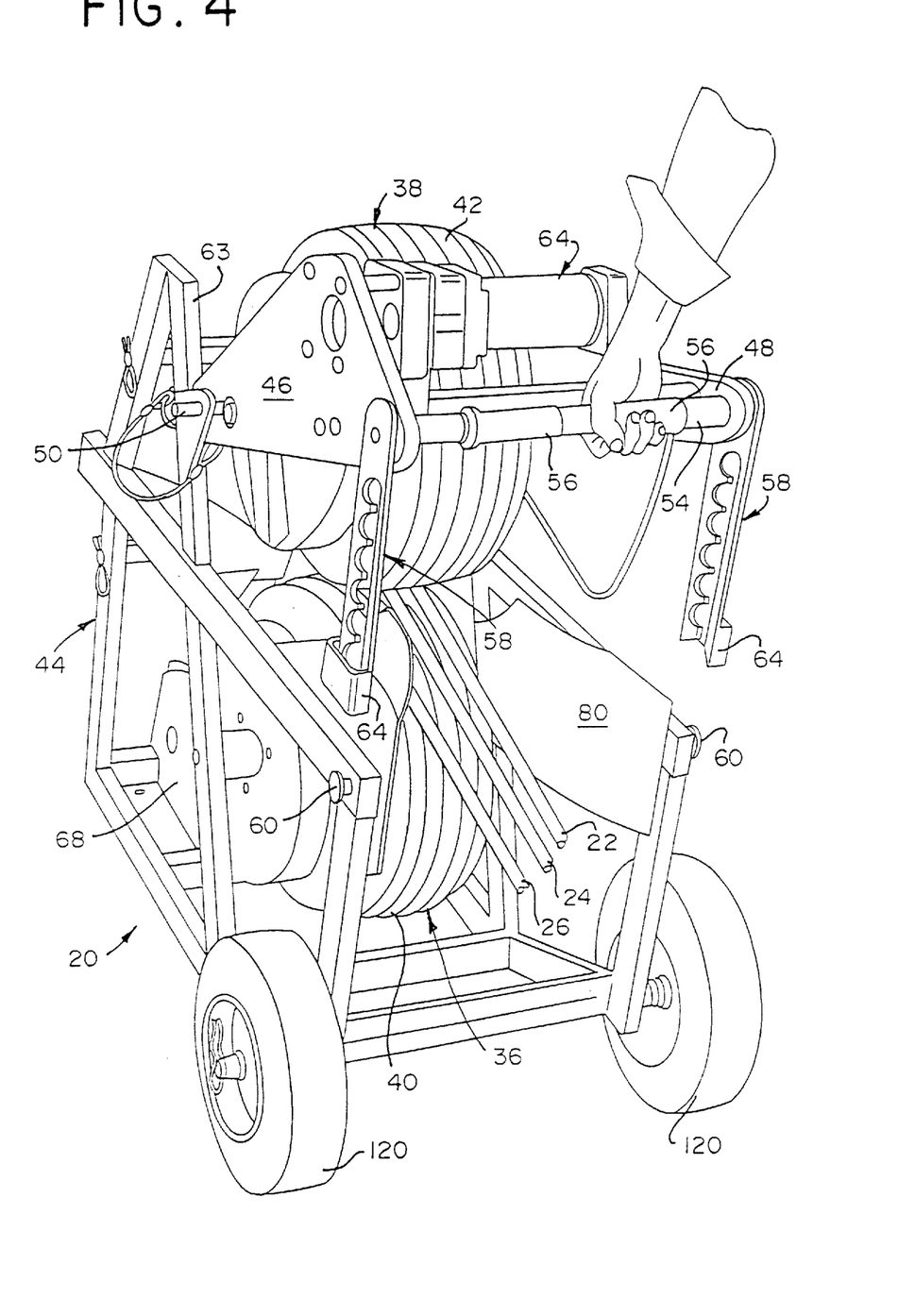
FIG. 4 is a front, right perspective view of the cable feeding device illustrated in FIG. 1, showing the device in a partially open position.

As shown in FIGS. 1 and 3, the rotating members 36, 38 of the device 20 are mounted on a frame 44. While the lower rotating member 36 is mounted to the frame 44 such that the rotating member 36 cannot readily be pivoted with respect thereto (see also FIG. 2), the upper rotating member 38 is preferably mounted to arms 46 and 48 which are pivotable (at pins 50 and 52, respectively) with respect to the frame 44. The fact that the upper rotating member 38 is mounted to the pivotable arms 46 and 48 provides that the upper rotating member 38 can be pivoted with respect to the lower rotating member 36 to effectively set the pressure which the rotating members 36 and 38 will exert on the cables 22, 24, 26 during the feeding operation. Additionally, as shown in FIGS. 4, 5 and 6, the upper rotating member 38 can be pivoted away from the lower rotating member 36 thereby effectively opening the device 20 (FIG. 4 depicts the device 20 in a partially open position while FIGS. 5 and 6 depict the device 20 in a fully open position). At this time, the one or more cables 22, 24, 26 can be inserted or removed from between the rotating members 36 and 38 before the upper rotating member 38 is re-pivoted back into the position shown in FIGS. 1 and 3.

To provide this pivoting feature, a handle 54 is provided adjacent one end of the arms 46, 48, and the handle 54 spans the distance between the arms 46 and 48. The handle 54 extends through the arms 46, 48 thereby providing that the handle 54 can be rotated with respect to the arms 46 and 48. Handle grips 56 (shown only in FIG. 4) may be provided on the handle 54 for facilitating the gripping and rotating of the handle 54.

Indexing structure is provided on the handle 54 and the frame 44 to provide that the pivoting arms 46 and 48 can be locked in several different desired positions with respect to the frame 44. Specifically, as shown in FIGS. 1, 2 and 3, preferably the indexing structure on the handle 54 includes a ratchet 58 connected to each end of the handle 54, and each ratchet 58 indexes with a knob or key 60 on the frame 44, as shown in FIGS. 1 and 2. This indexing provides that the handle 54 can be rotated to engage particular slots in the ratchets 58 with the keys 60 on the frame 44 thereby locking the arms 46 and 48, and therefore also the upper rotating member 38, in a desired position. The handle 54 can be rotated to disengage the slots in the ratchets 58 from the keys 60, and then the handle 54 can be pulled or pushed on to pivot the arms 46, 48 with respect to the frame 44 to effectively place the upper rotating member 38 in a different desired position before rotating the handle 54 to re-engage the ratchets 58 with the keys 60 on the frame 44. The setting of the distance between the upper rotating member 38 and the lower rotating member 38 using the handle 54 effectively sets the pressure the rotating members 36 and 38 will exert on the cables 22, 24, 26 as the rotating members pull the cables 22, 24, 26 off the reels 28, 30, 32, respectively (see FIG. 7) and forward them to the conduit 34. If the rotating members 36 and 38 are provided as being pneumatic tires, the internal air pressure of the tires can also be selected to effectively select a desired pressure with the cables 22, 24, 26.

At the bottom of each ratchet 58 is clearance structure 62 for allowing the ratchet 58 to be disengaged from the corresponding key 60 on the frame 44. This provides that the arms 46, 48 can be pivoted more fully upward until the arms 46, 48 contact the frame 44 at surfaces 63 (the surfaces 63 are identified in FIG. 1 and FIG. 5, for example). This effectively provides that the upper rotating member 38 can be pivoted away from the lower rotating member 36, in effect opening the device 20, as discussed above, and as shown in FIGS. 5 and 6. At this time, the cables 22, 24, 26 can be inserted or removed from between the rotating members 36 and 38 before the upper rotating member 38 is re-pivoted back into the position shown in FIGS. 1 and 3, and the ratchets 58 re-engaged with the keys 60 on the frame 44 to secure the upper rotating member 38 in the desired position.

As shown in FIGS. 1 and 3, a motor 64 is connected to one of the arms 46. The motor 64 is driveably connected to the upper rotating member 38, and operation of the motor 64 causes rotation of the upper rotating member 38. As shown in FIG. 3, another motor 66 is mounted to the frame 44 and is driveably connected to the upper rotating member 36, where operation of the motor 66 causes rotation of the upper rotating member 36. As shown in FIG. 1, preferably a motor cover 68 is connected to the frame 44 and covers the motor 64 which drives the lower rotating member 36.

Figure 10:
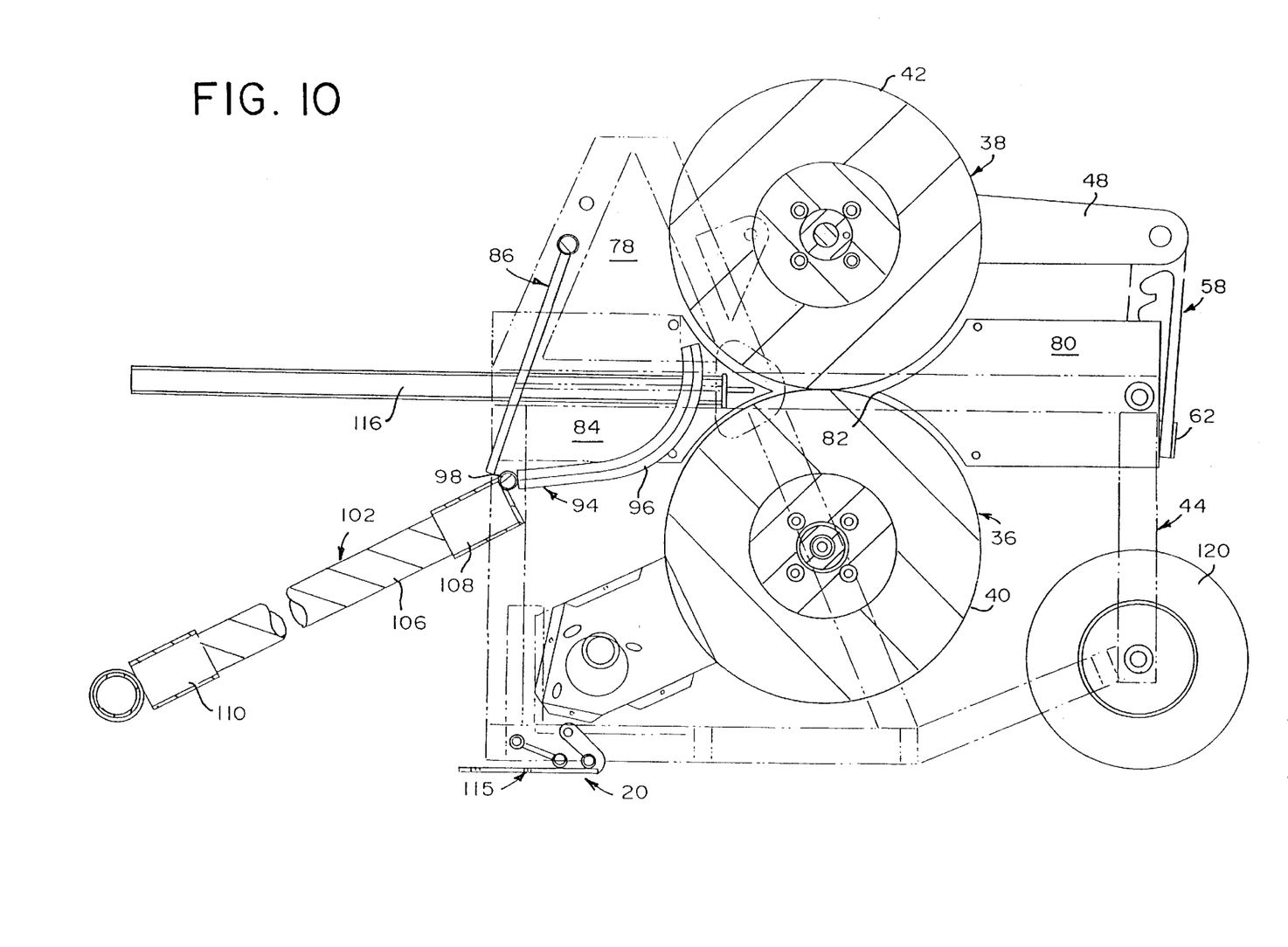
FIG. 10 is a cross-sectional view of the cable feeding device illustrated in FIGS. 1 and 3, taken along line 10—10 of FIG. 9.
Figure 11:
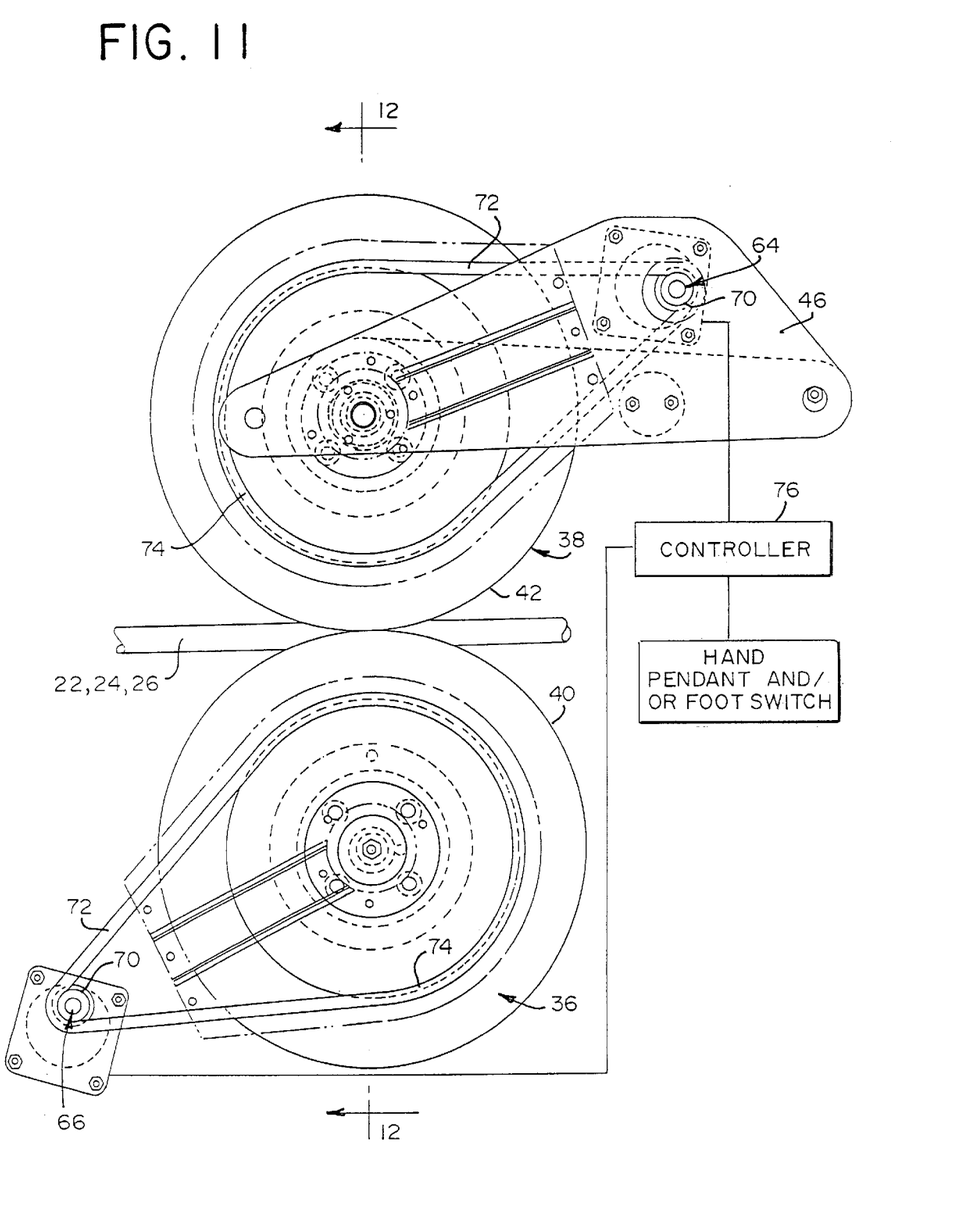
FIG. 11 is a side, elevational view of two rotary member/motor assemblies of the cable feeding device illustrated in FIGS. 1 and 3, showing the assemblies isolated from the remainder of the device for clarity.

FIG. 11 illustrates the upper and lower rotating members 36 and 38, respectively, as well the motors 64 and 66 and the pivotable arms 46, 48 isolated from the rest of the device 20. As shown, preferably each motor 64 and 66 is connected to a sprocket 70 which drives a chain 72, and the chain 72 is engaged with another sprocket 74 which is on the respective rotating member 36, 38. The sprockets 70 which are connected to the motors 64 and 66 may be ten teeth sprockets, and the sprockets 74 connected to the rotating members 36, 38 may be seventy-two teeth sprockets. Each motor 64, 66 may be a ½ hp permanent magnet motor. Additionally, preferably each motor 64, 66 is a variable speed motor and is connected to a controller 76. Preferably the controller 76 is controlled via a hand pendant and is mounted to the frame 44 of the device 20, such as to position 78 as indicated on FIG. 10. A plug-in port may be provided on the controller 76 for receiving a foot switch where the foot switch effectively takes the place of (or augments) the hand pendant and allows operation of the motors 64 and 66 by foot instead of (or in addition to) by hand. Preferably, the controller 76 includes a knob which can be rotated to adjust the speed of the motors 64 and 66.

Although it is preferred that both rotating members 36 and 38 are directly driven by separate motors 64 and 66, it is also possible to provide that one of the rotating members 36 or 38 is an idler (i.e. is passive or not driven), and instead rotates as a result of movement of the cables 22, 24, 26 which is caused by the rotation of the other rotating member 38 or 36. However, in the case, the idler rotating member would drag the other, and that is why this arrangement is not specifically preferred.

As shown in FIG. 1, mounted to a front portion of the frame 44 are guide panels 80. The guide panels 80 are curved and, as shown in FIG. 10, each preferably terminates in a point 82 which is generally aligned with the top of the lower rotating member 36. The guide panels 80 provide that the cables 22, 24, 26 which are being pulled off the reels 28, 30, 32 by the rotating members 36 and 38 are guided between the rotating members 36, 38. The guide panels 80 ensure that none of the cables 22, 24, 26 escape from between the rotating members 36, 38 and out of contact with the peripheral surfaces 40, 42 of the rotating members 36, 38 during the feeding operation. As shown in FIGS. 3 and 6, similar guide panels 84 are mounted to a rear portion of the device 20, and these guide panels 84 further ensure that the cables 22, 24, 26 remain between the rotating members 36 and 38.

Figure 13:
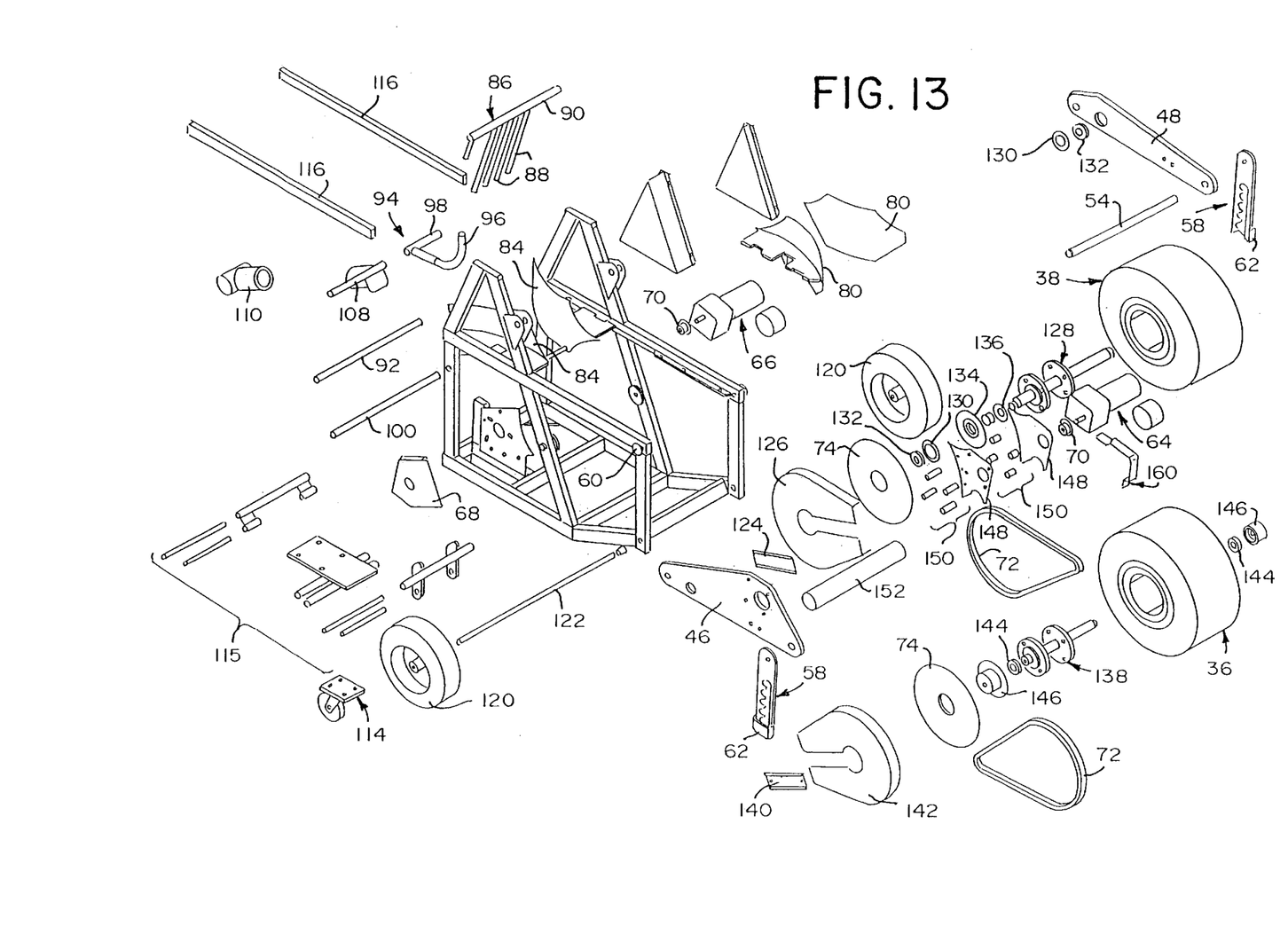
FIG. 13 is an exploded version of the perspective view of FIG. 1.

As shown in FIGS. 2 and 3, also mounted to the rear portion of the frame 44 is a cable divider 86. The cable divider 86 preferably provides a plurality of parallel bars 88 which extend from a collar portion 90 which is generally perpendicular to the parallel bars 88, where the collar portion 90 is mounted to a shaft 92 which is mounted to the frame 44 of the device (the shaft 92 is shown in FIG. 13). Preferably the collar portion 90 is hollow and coaxially receives the shaft 92 such that the cable divider 86 can be rotated on the shaft 92 relative to the frame 44. Stops (not shown) may be provided to define the range of rotation of the cable divider 86 around the shaft 92. The parallel bars 88 function to keep the cables 22, 24, 26 separate from each other during the feeding operation. As a result, the cables 22, 24, 26 do not tend to overlap or become tangled while the cables 22, 24, 26 feed through the device 20, between the rotating members 36 and 38, and onward to, for example, the conduit 34 as shown in FIG. 7.

Figure 12:
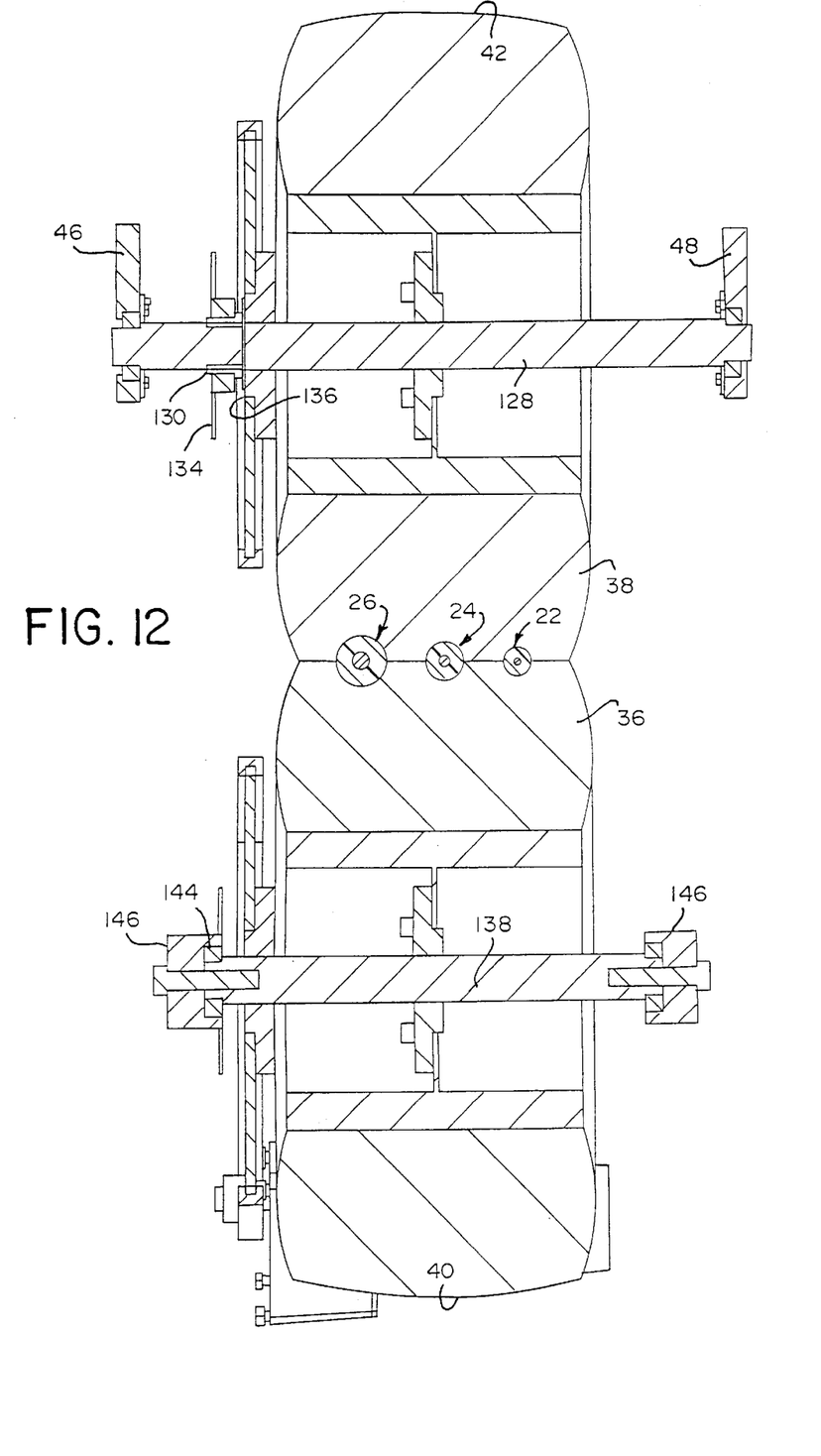
FIG. 12 is a cross-sectional view of the rotary member/motor assemblies illustrated in FIG. 11, taken along line 12—12 of FIG. 11.

As discussed above, during the feeding operation, the rotating members 36 and 38 pull and forward the cables 22, 24, 26 as a result of frictional engagement between outer peripheral surfaces 40 and 42 of the rotating members 36 and 38, respectively, and the cables 22, 24, 26. More specifically, preferably the outer peripheral surfaces 40 and 42 of the rotating members 36 and 38, respectively, are convex as shown in FIG. 12, and generally conform to the cables 22, 24, 26 as the cables 22, 24, 26 feed between the rotating members 36 and 38. This conformation provides enhanced traction between the rotating members 36 and 38 and the cables 22, 24, 26. Additionally, the spacing between the individual cables 22, 24, 26, which results due to the cable divider 86 as discussed above, provides not only that the cables 22, 24, 26 do not have a tendency to overlap or to tangle during the feeding operation, but also ensures that the rotating members 36 and 38 can exert sufficient frictional pulling force (i.e. traction) on each individual cable 22, 24, 26 to effect the feeding operation and keep any of the cables 22, 24, 26 from stalling.

Figure 9:
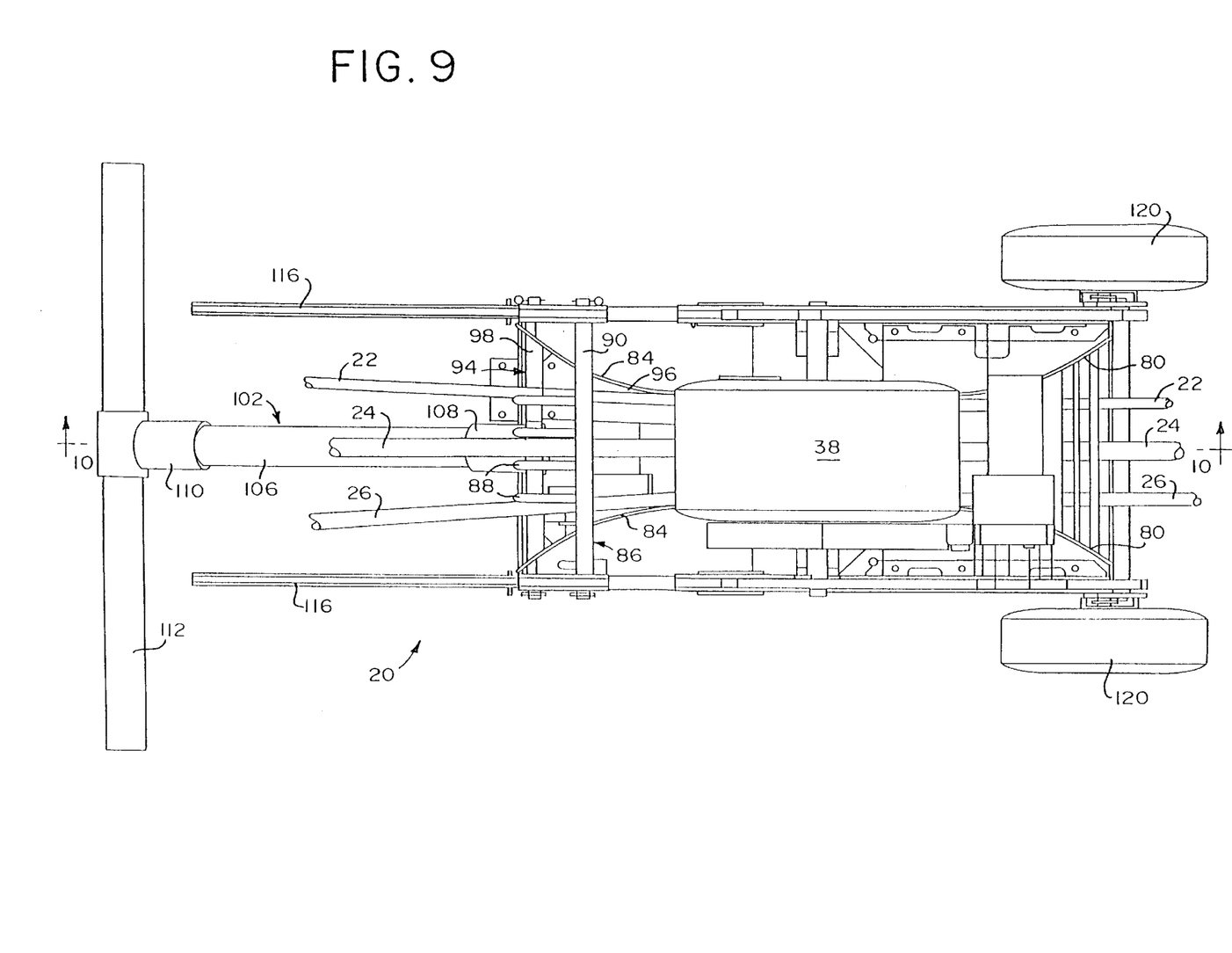
FIG. 9 is a top, plan view of the cable feeding device illustrated in FIGS. 1 and 3.

To ensure adequate traction, it is desirable to keep smaller cables (such as cable 22) spaced away from larger cables (such as cables 24 and 26) in the cable grouping. This is because engagement of the rotating members 36 and 38 with a larger cable may negatively effect the ability for the rotating members to have adequate traction with a smaller cable if the smaller cable is too close to the larger cable as the cables 22, 24, 26 feed between the rotating members 36 and 38. Therefore, as shown in FIGS. 2, 9 and 10, preferably a sub-divider 94 is mounted to the frame 44 of the device 20 (see also FIG. 13). The sub-divider 94 preferably comprises a bar 96 which is curved and extends generally upward toward the rotating members 36 and 38. The bar 96 extends from a collar portion 98 which is hollow and coaxially receives a shaft 100 that is mounted on the frame 44 (the shaft 100 is shown in FIG. 13). Preferably the collar portion 98 of the sub-divider 94 is mounted to the shaft 100 such that the sub-divider 94 can be pivoted or rotated about the shaft 100 with respect to the frame 44 of the device 20. Stops (not shown) may be provided to define the range of rotation of the sub-divider 94 around the shaft 100. The pivoting provides that the bar 96 of the sub-divider 94 can be pivoted out of the way during the initial loading of the cables 22, 24, 26 between the rotating members 36 and 38—for example, when the device 20 is in the open position as shown in FIG. 7. As shown in FIG. 9, the sub-divider 94 is preferably used to keep smaller cables (such as cable 22) spaced away from larger cables (such as cables 24 and 26) in the cable grouping during the feeding operation. More specifically, the sub-divider 94 provides, during the feeding operation, that cables (such as cable 22) which are positioned on one side of the bar 96 are kept spaced away from cables (such as cables 24 and 26) which are positioned on the other side of the bar 96. Preferably, one or more smaller cables, such as one or more ground cables, are positioned to one side of the bar, and the larger cables are positioned to the other side of the bar. Therefore, during the feeding operation, smaller cables are kept spaced away from the larger cables. As a result of the cable divider 86 and the sub-divider 94, all the cables 22, 24, 26 are kept separate enough from each other to ensure adequate traction of each cable 22, 24, 26 with the rotating members 36 and 38.

As shown in FIGS. 1, 2, 3, 5, 6, 7, 9 and 10, mounting structure 102 extends from the frame 44 of the device 20. As shown in FIG. 7, the mounting structure 102 engages against structure 104 which carries one or more of the reels 28, 30, 32, thereby preventing the device 20 from moving substantially toward the reels 28, 30, 32 carrying the cables 22, 24, 26 as the device 20 pulls the cables 22, 24, 26 from the reels 28, 30, 32. Specifically, the mounting structure 102 may comprise a stiff arm boom including a spacing bar 106 where one end of the spacing bar 106 is insertable in a receptacle or collar 108 which is retained on the shaft 100 (the shaft 100 is shown in FIG. 13) that is mounted to the frame 44 of the device 20, and the other end of the spacing bar 106 is insertable in a T-shaped collar 110 which receives an anchor bar 112. Preferably, the anchor bar 112 which is received in the T-shaped collar 110 is long enough to span two reel stands. The length of the spacing bar 106 defines the space between the device 20 and the structure 10 4 against which the device 20 contacts during the feeding operation (see FIG. 7). The mounting structure 102 effectively eliminates the need to anchor the device 20 to the ground during the feeding operation. However, anchor pads may be provided on the bottom of the frame 44 for receiving anchors for engagement with the ground.

As discussed, both the collar portion 98 of the sub-divider 94 and the collar portion 108 of the mounting structure 102 are mounted on a shaft 100 (see FIG. 13) which is mounted to the frame 44 of the device 20. The shaft 100 is generally parallel to the shaft 92 on which the cable divider 86 is mounted. When the cable divider 86 is pivoted into the engaged or down position, as shown in FIG. 3, the parallel bars 88 of the cable divider 86 contact the collar portions 98 and 108 of the sub-divider 94 and mounting structure 102 (see also FIG. 9).

As shown in FIGS. 1, 2, 3, 6, 9 and 10, preferably handles 116 are provided on the frame 44 for transporting the device 20. Preferably the handles 116 are telescoping in that they are retractable and extendable into and out of the frame 44 of the device 20 (as represented by arrow 118 on FIG. 1). Stops (not shown) may be provided on the handles 116 and/or the frame 44 for preventing the complete withdrawal of the handles 116 from the device 44 and/or for preventing the handles 116 from traveling too far into the frame 44 during retraction of the handles 116.

Figure 8:
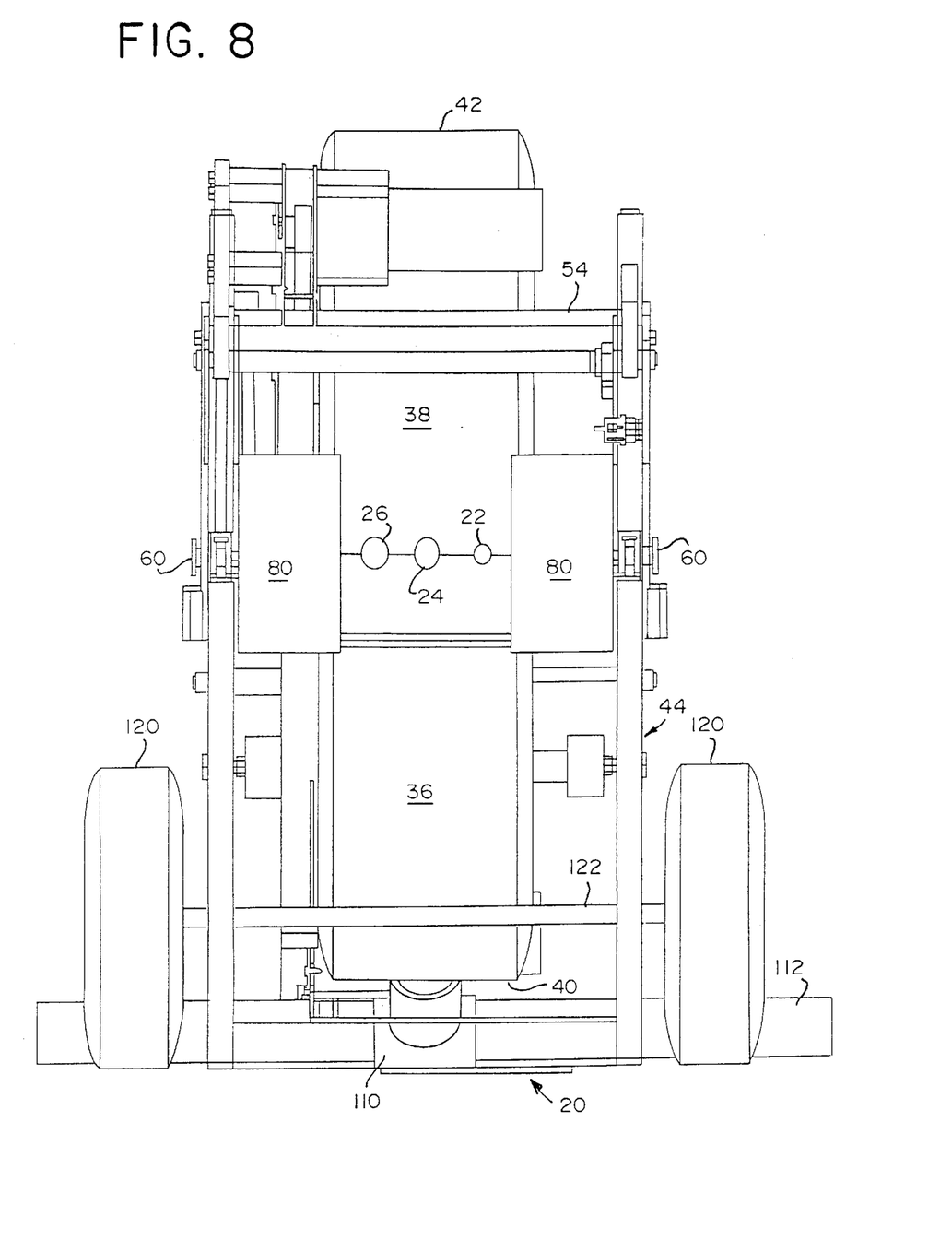
FIG. 8 is an elevational view of a front of the cable feeding device illustrated in FIGS. 1 and 3.

As shown in FIGS. 1–10, wheels 120 may also be provided on the frame 44 for facilitating the transportation of the device 20. As shown in FIGS. 1 and 8, the wheels 120 may be mounted on an axle 122 that mounted to the frame (the axle 122 is also clearly depicted and identified in FIG. 13). A braking mechanism (not shown) may be provided in connection with the wheels 120 for preventing movement of the wheels 120, such as during the feeding operation. In addition to the wheels 120, a supplemental wheel 114 and corresponding structure 115 may be provided on the frame 44 (the wheel 114 is depicted only in FIG. 13 while the corresponding structure 115 is depicted in FIGS. 10 and 13). The wheel 114 is preferably centered on the bottom of the device 20 and is pivotable into and out of engagement with the ground.

Most of the components of the device have already been described. However, FIG. 13 depicts some other parts of the device to which no specific reference has been made hereinabove. These additional parts include a guard insert 124 and a chain guard 126 which are disposed between sprocket 74 and one of the pivotable arms 46. The upper rotating member 38 is mounted on an axle 128, and the axle 128 also carries a bearing 130 and a bearing spacer 132 on each side of the rotating member 38. The axle 128 also carries a guard carrier 134 and a thrust bearing 136. The lower rotating member 36 is also carried by an axle 138, and the axle 138 carries a guard insert 140 and a chain guard 142, as well as a bearing 144 and bearing housing 146 on each side of the rotating member 36. Other parts appearing in FIG. 13 include motor guards 148 and stand-off members 150 which are associated with the motor 66 which drives the lower rotating member 36, a cross bar 152 which spans the distance between the pivotable arms 46 and 48, and an edge guard 160.

Operation of the device 20 will now be described. Specifically, operation of the device 20 to pull three cables 22, 24, 26 from three individual reels 28, 30, 32, respectively, and feed the cables 22, 24, 26 to a conduit 34, as shown in FIG. 7, will be described. Initially, the device 20 is positioned in front of the reels 28, 30, 32 with the mounting structure 102 braced against structure 104 which carries the front-most reel 30. Alternatively, the device 20 may be anchored to the ground. Regardless, preferably the reels 28, 30, 32 are positioned such that the angle of entry of each of the cables 22, 24, 26 into the device 20 does not exceed twenty-five degrees with respect to a line defined by cable reel 24 against which the device 20 is braced and the device 20 itself.

Once the device 20 is positioned with respect to the reels 28, 30, 32, the ends of the cables 22, 24, 26 are fed to the device 20. Specifically, the device 20 may be initially set in the open position as described above and as shown in FIGS. 5 and 6, and the cables 22, 24, 26 inserted between the rear guide panels 84, between the rotating members 36 and 38 and between the front guide panels 80. In positioning the cables 22, 24, 26 between the rotating members 36 and 38, preferably none of the cables 22, 24, 26 overlap each other and the smaller cables of the group (in this case, cable 22) are fed to the side of the device 20 on which the sub-divider 94 is positioned.

Once the cables 22, 24, 26 have been initially engaged with the device 20, the upper rotating member 38 may be pivoted down toward the lower rotating member 36 using the handle 54, and the handle 54 manipulated to engage the ratchets 58 on the ends of the handle 54 with the keys 60 on the frame 44 of the device 20 to obtain a desired setting of the upper rotating member 38 with respect to the lower rotating member 36, such as is shown in FIGS. 1 and 3. The setting determines the pressure at which the rotating members 36 and 38 will pull on the cables, and will often depend on the diameters of the cables 22, 24, 26 which are to be pulled.

At the time that the cables 22, 24, 26 are initially engaged with the device 20, the cable divider 86 may be pivoted into a position such that the parallel bars 88 extend generally upward. Additionally, the sub-divider 94 may be pivoted into a position such that the bar 96 extends generally away from the rotating members 36 and 38. These respective positions of the cable divider 86 and the sub-divider 94 provide that these structures do not obstruct the area between the rear guide panels 84. This generally provides for easier initial loading of the cables 22, 24, 26 into the device 20. Once the cables 22, 24, 26 are loaded between the rotating members 36 and 38, and the upper rotating member 38 is pivoted downward into the desired position with respect to the lower rotating member 36, the cable divider 86 and the sub-divider 94 may be pivoted into the positions shown in FIG. 3. Preferably, as shown in FIG. 9, smaller cables (in this case cable 22), such as ground cables, are positioned on one side of the sub-divider 94, and larger cables (in this case cables 24 and 26) are positioned on the other side of the sub-divider 94 when the sub-divider 94 is pivoted into position. Also, as shown in FIGS. 3 and 9, preferably the parallel bars 88 separate the cables 22, 24, 26 when the cable divider 86 is pivoted into position. Of course, should more cables be fed to the device than there are separations defined by the parallel bars 88 of the cable divider 86, more than one cable can be fed in a single space between two of the parallel bars 88 of the cable divider 86. However, preferably the smaller cables, such as ground cables, are still kept separate from the larger cables by the sub-divider 94.

As shown in FIG. 12, when the upper rotating member 38 is brought into the desired position, the outer peripheral surfaces 40 and 42 of the rotating members 36 and 38, respectively, engage the cables 22, 24, 26, and because the surfaces 40 and 42 are generally flexible, they generally conform to the cables 22, 24, 26. This provides enhanced traction between the cables 22, 24, 26 and the rotating members 36 and 38, and provides that the rotating members 36 and 38 can pull the cables 22, 24, 26 off the reels 28, 30, 32 once the motors 64 and 66 are actuated.

Once the cables 22, 24, 26 are initially fed to the device 20 and the upper rotating member 38 is locked into the desired position, the knob on the controller 76 can be set to select the desired operating speed of the motors 64 and 66, and therefore the desired speed of rotation of the rotating members 36 and 38. Then, a main switch on the controller 76 can be actuated to start the motors 64 and 66 thereby causing rotation of the rotating members 36 and 38. Alternatively, the hand pendant or foot switch can be actuated to start the motors 64 and 66. The actuation of the motors 64 and 66 causes the rotating members 36 and 38 to rotate thereby pulling the cables 22, 24, 26 off their reels 28, 30, 32 and feeding the cables 22, 24, 26 forward to the conduit 34.

Of course, the ends of the cables 22, 24, 26 may be initially fed to the device 20 with the upper rotating member 38 already locked into the desired position and the motors 64 and 66 running. However, it is preferred that the initial loading of the cables 22, 24, 26 into the device 20 be performed with the motors 64 and 66 off and the device 20 in the open position as shown in FIGS. 5 and 6.

To provide for trouble-free operation of the device, the motors 64 and 66 should be started in a relatively slow speed setting and the slack in the cables 22, 24, 26 between the reels 28, 30, 32 and the device 20 should be removed. However, at least some slack in the cables 22, 24, 26 should be maintained between the device 20 and the conduit 34 during the feeding operation.

While a preferred embodiment of the present invention is shown and described, it is envisioned that those skilled in the art may devise various modifications of the present invention without departing from the spirit and scope of the appended claims.

What is claimed is:

1. A device for removing a plurality of cables from a plurality of reels and thereafter advancing the cables, said device comprising: a pair of rotary members positionable relative to each other such that the cables are frictionally retained therebetween, each of said rotary members having a generally flexible peripheral surface which frictionally contacts the plurality of cables and generally at least partially conforms thereto; a motor connected to at least one of said rotary members, said motor rotating said rotary member thereby causing said rotary members to pull the cables from the reels and thereafter advance the cables; and a pivotable divider adjacent said rotary members, said pivotable divider pivotable into a non-operable position and into an operable position, wherein in said operable position said divider receives the cables from the reels before the cables travel to said rotary members, said divider configured for keeping the cables spaced away from each other as the cables are fed to said rotary members, and wherein in said non-operable position said divider is generally out of the way of the cables.

2. A device as recited in claim 1, each of said rotary members having a generally convex peripheral surface.

3. A device as recited in claim 1, at least one of said rotary members being pivotable with respect to the other thereby providing that at least one cable can be inserted between the rotary members without having to feed the cable between said rotary members while said rotary members are rotating as result of operation of said motor.

4. A device as recited in claim 1, said divider comprising a set of spaced-apart parallel bars.

5. A device as recited in claim 1, further comprising a sub-divider between said divider and said rotary members for further keeping one or more cables spaced away from the other cables.

6. A device as recited in claim 1, further comprising mounting structure comprising a stiff arm boom extending from said device for contacting structure which carries at least one of the reels of cable, said mounting structure preventing said device from moving substantially toward said structure during feeding of the cables to said rotary members, said stiff arm boom comprising a bar which is insertable in a mounting bracket on said device.

7. A device as recited in claim 1, further comprising handles for moving said device, said handles being at least partially extendable from and retractable into said device.

8. A device as recited in claim 1, each of said rotary members connected to a motor such that each of said rotary members is driven independently of the other.

9. A device as recited in claim 1, said motor comprising a variable speed motor.

10. A device as recited in claim 8, each of said motors comprising a variable speed motor.

11. A device as recited in claim 9, further comprising a controller operatively connected to said motor for controlling the speed thereof, said controller operable by at least one of by hand or by foot.

12. A device as recited in claim 1, further comprising structure for setting the position of said rotary members relative to each other during rotation thereof thereby setting a pressure at which said rotary members pull the cables.

13. A device as recited in claim 12, said structure for setting the position of said rotary members relative to each other comprising a key on a first frame wherein one of said rotary members is mounted on said first frame; and a ratchet on a second frame wherein the other of said rotary members is mounted on said second frame, said key being receivable in said ratchet and retainable in a plurality of positions for setting the position of said rotary members relative to each other, said ratchet connected to a handle, said handle rotatable to engage and disengage said ratchet with said key.

14. A device as recited in claim 4, wherein said sub-divider is also pivotable into a non-operable position and into an operable position, and is pivotable independent of pivoting of said divider.

15. A device as recited in claim 1, wherein each of said rotary members is configured to receive a plurality of said cables.

16. A device for removing a plurality of cables from a plurality of reels and thereafter advancing the cables, said device comprising: a pair of rotary members positionable relative to each other such that the cables are frictionally retained therebetween, each of said rotary members having a peripheral surface which frictionally contacts the plurality of cables and generally at least partially conforms thereto; a motor connected to at least one of said rotary members, said motor rotating said rotary member thereby causing said rotary members to pull the cables from the reels and thereafter advance the cables, at least one of said rotary members being pivotable with respect to the other thereby providing that at least one cable can be inserted between the rotary members without having to feed the cable between the rotary members while said rotary members are rotating as result of operation of said motor; and a pivotable divider adjacent said rotary members, said pivotable divider pivotable into a non-operable position and into an operable position, wherein in said operable position said divider receives the cables from the reels before the cables travel to said rotary members, said divider configured for keeping the cables spaced away from each other as the cables are fed to said rotary members, and wherein in said non-operable position said divider is generally out of the way of the cables.

17. A device as recited in claim 16, said divider comprising a set of spaced-apart parallel bars.

18. A device as recited in claim 16, further comprising a sub-divider between said divider and said rotary members for further keeping one or more cable spaced away from the other cables.

19. A device as recited in claim 1, further comprising mounting structure comprising a stiff arm boom extending from said device for contacting structure which carries at least one of the reels of cable, said mounting structure preventing said device from moving substantially toward said structure during feeding of the cables to said rotary members, said stiff arm boom comprising a bar which is insertable in a mounting bracket on said device.

20. A device as recited in claim 16, further comprising handles for moving said device, said handles being at least partially extendable and retractable into said device.

21. A device as recited in claim 1, each of said rotary members connected to a motor such that each of said rotary members is driven independently of the other.

22. A device as recited in claim 1, said motor comprising a variable speed motor.

23. A device as recited in claim 21, each of said motors comprising a variable speed motor.

24. A device as recited in claim 22, further comprising a controller operatively connected to said motor for controlling the speed thereof, said controller operable by at least one of by hand or by foot.

25. A device as recited in claim 16, further comprising structure for setting the position of said rotary members relative to each other during rotation thereof thereby setting a pressure at which said rotary members pull the cables.

26. A device as recited in claim 25, said structure for setting the position of said rotary members relative to each other comprising a key on a first frame wherein one of said rotary members is mounted on said first frame; and a ratchet on a second frame wherein the other of said rotary members is mounted on said second frame, said key being receivable in said ratchet and retainable in a plurality of positions for setting the position of said rotary members relative to each other, said ratchet connected to a handle, said handle rotatable to engage and disengage said ratchet with said key.

27. A device as recited in claim 17, wherein said sub-divider is also pivotable into a non-operable position and into an operable position, and is pivotable independent of pivoting of said divider.

28. A device as recited in claim 16, wherein each of said rotary members is configured to receive a plurality of said cables.

* * * * *